H. FUTTERMAN.
LAMP BRACKET.
APPLICATION FILED MAY 5, 1915.
1,247,389.
Patented Nov. 20, 1917.
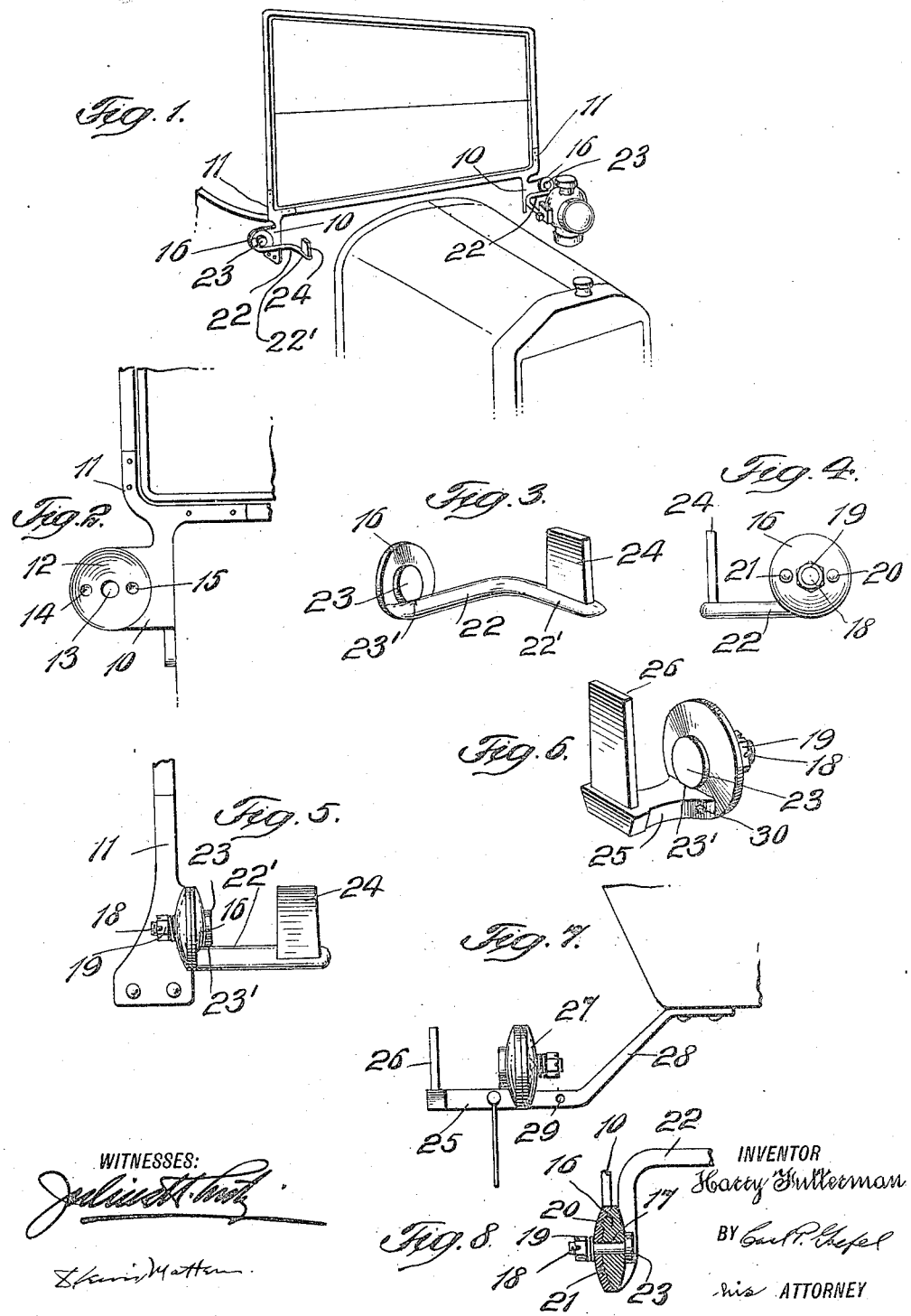
WITNESSES:
INVENTOR
Harry Futterman
BY Carl P. Goepel
his ATTORNEY

UNITED STATES PATENT OFFICE.

HARRY FUTTERMAN, OF NEW YORK, N. Y.

LAMP-BRACKET.

1,247,389.  Specification of Letters Patent.  Patented Nov. 20, 1917.

Application filed May 5, 1915. Serial No. 25,879.

*To all whom it may concern:*

Be it known that I, HARRY FUTTERMAN, a citizen of the United States, and a resident of the borough of Manhattan, in the city, county, and State of New York, have invented certain new and useful Improvements in Lamp-Brackets, of which the following is a specification.

This invention relates to improvements in and relating to lamp brackets for automobiles, and particularly a bracket to be fitted to automobiles of such fixed construction of a well known and popular type of car. In this particular type of car, sidelights and tail-lights are secured by screws provided at the rear of the said lights to a recessed plate, which is provided integral with the corner piece of the wind-shield frame. Because of the location of these lamps and the particular construction of the same, they very often go out, and it is, therefore, advantageous to procure a new set of lamps so constructed that in this position they will be proof against the wind, but with the brackets provided on these machines, it is impossible to attach any of the well known types of lamps at present in use, such lamps being provided with a combination prop-holder, which fits the usual prop provided for the same.

An object of the present invention, therefore, is to provide a bracket which may be secured to the said type of automobile, and to which may be affixed any of the various well known makes of lamps as distinguished from the lamps above referred to and supplied with the equipment of such automobiles. Another object is to provide means by which the lamps may be set at the side of the wind-shield and in the path of the wind instead of in front of the same. A still further object is to provide such a bracket which may be readily secured to the machine, and which will support the lamp securely against shocks and jars, and which will be simple in construction and inexpensive to manufacture.

With these and other objects in view, my invention comprises the novel features, arrangement and combination of parts, hereinafter more fully described with reference to the accompanying drawings, and particularly pointed out in the claim.

In the drawings,

Figure 1 is a perspective view of a portion of an automobile, showing the application of my invention thereto;

Fig. 2 is a front elevation in detail of the corner pieces of the wind-shield frame and the lamp bracket of the above type of car;

Fig. 3 is a perspective view of my improved bracket;

Fig. 4 is a rear view thereof;

Fig. 5 is a top plan view thereof;

Fig. 6 shows a modified form as applied for the tail-light and license plate of an automobile;

Fig. 7 is a side view thereof as attached to the automobile; and

Fig. 8 is a plan view of the side-lamp bracket, partly in section.

Similar reference characters indicate corresponding parts throughout the several views.

The drawings show a lamp bracket 10 in its general structure of a well known type to which lamps are usually attached directly. This structure consists of a plate 10 disposed in a vertical plane and made integral with the corner piece 11 of the wind-shield and provided with a central aperture 13 to which an ordinary bolt is passed for holding the lamp on said bracket. The circular concaved portion 12 is provided with sockets 14 and 15 disposed at diametrically opposite points.

In the embodiment of the invention as shown in Figs. 1, 2, 3, 4 and 5, a right angled member is composed of a horizontal lateral arm 22 and a horizontal longitudinal arm 22'. This right angled member is provided at the outer end of its longitudinal arm with an upright lamp-holding lug 24 of the ordinary type adapted to receive various styles of automobile lamps. A vertical disk 16 having a central aperture 17 is fixed on one side of its aperture, preferably on the side below it, to one side of said horizontal lateral arm 22 parallel therewith at the outer end thereof, said arm projecting across said disk in a position of a chord. This vertical apertured attaching disk is provided with studs 20 and 21 adapted to engage the sockets 14 and 15 of the fixed bracket 10. These interlocking devices prevent radial displacement of the disk under stress of the weight of the lamp.

A bolt 18 passing through the aperture 17 of the vertical disk 16 and through the aperture 13 of the bracket 10 secures said disk to the fixed bracket and causes the projections of one to enter the sockets of the other and lock the parts together. The bolt 18 is provided with a lock or other nut 19. The head 23 of the bolt is provided with a flattened portion 23' which engages the upper surface of the horizontal arm 22 and prevents rotation of the bolt while the nut is being secured thereon.

If desired, the position of the brackets may be reversed, in which case the lamps would be at the sides of the wind-shield and in the path of the wind.

The above described construction is particularly adapted for the side-lights of the automobile, as illustrated in Fig. 1, but in Figs. 6 and 7 I have shown a slightly modified form designed for use with the tail-light and license-plate holder. A horizontal supporting member 25 is provided at the lower portion of the said disk, the disk being similar to that described with reference to the first construction, the flattened portion 23' of the bolt 18 engaging the upper surface of the said support. An upwardly extending rectangular member 26 is provided at the end of the said support, to which the lamp is attached. This bracket is secured to the recessed disk bracket 27, which is supported at the rear of the automobile by means of a bar 28. A threaded hole 29 is provided in this bar, to which is ordinarily attached a supporting member for the license-plate, but when the lamp is secured to my improved bracket, the same is farther removed from the machine than when attached to the ordinary bracket, so that it is desirable to also move the license-plate forwardly toward the lamp. For this purpose, the threaded hole 30 Fig. 6 is provided in the horizontal supporting member 25 of my improved bracket, in which the said license-plate support may be secured.

My improved bracket is preferably constructed of malleable iron, the various parts thereof being integral.

In automobiles such as those heretofore referred to where the fixed bracket permits the use of only one form of stock lamp, by the application of this supplementary bracket any of the popular forms of lamps desired may be used.

I have illustrated and described preferred and satisfactory forms of my invention, but it is obvious that changes may be made therein within the spirit and scope thereof, as defined in the appended claim.

I claim:—

The combination of a wind shield provided with a laterally projecting vertical fixed bracket having an aperture, a detachable bracket comprising an apertured disk adapted to fit said wind shield bracket, an arm attached to the front face of said disk below its aperture and extending laterally therefrom, an arm extending forward from said lateral arm and an upright lamp holding lug at the forward end of said last named arm, interlocking means between said disk and bracket, and a bolt uniting said bracket and disk.

In testimony that I claim the foregoing as my invention, I have signed my name in presence of two subscribing witnesses.

HARRY FUTTERMAN.

Witnesses:
 FERRIS MATTERN,
 JOS. BISBANE.